A. L. McGREGOR.
AUTOMOBILE BUMPER.
APPLICATION FILED MAR. 24, 1920.
1,366,195.  Patented Jan. 18, 1921.
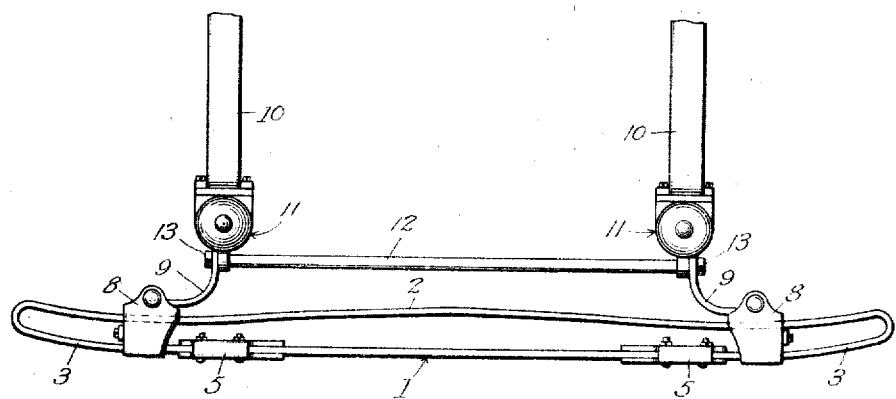
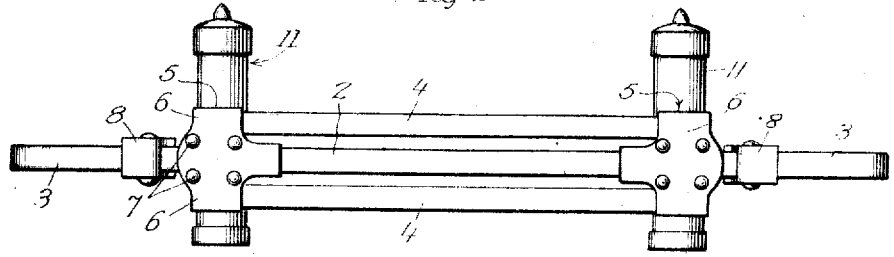
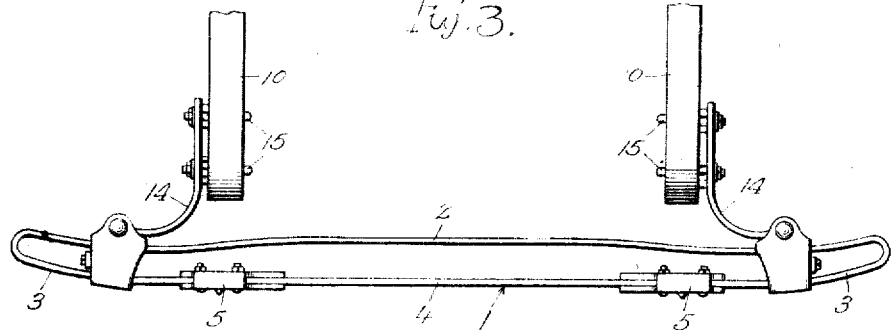
Inventor
Allan L. McGregor

UNITED STATES PATENT OFFICE.

ALLAN L. McGREGOR, OF CHICAGO, ILLINOIS.

AUTOMOBILE-BUMPER.

1,366,195.  Specification of Letters Patent.  Patented Jan. 18, 1921.

Application filed March 24, 1920. Serial No. 368,465.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to those devices adapted for attachment to the front or rear end of motor vehicles for the purpose of protecting the vehicle from damage in the event of collision with other vehicles or objects.

The purpose of this invention is to provide a new and novel structure for a device of the character described, embodying in general a bumper structure composed of members having a degree of resiliency calculated to absorb the shock of impact, and further to provide a structure having an increased impact surface throughout its central portion, thereby affording greater degree of protection to the vehicle.

Figure 1 is a top plan view of a bumper attached to the end of the vehicle frame and in connection with so-called Westinghouse type of shock absorbers.

Fig. 2 is a front view in elevation of the bumper, and

Fig. 3 is a top plan view of the bumper structure connected directly to the frame members of the vehicle.

A preferable construction of a bumper embodying the features of my invention comprises a central impact section 1, a rear section 2, and end sections 3, 3 formed integral with the rear section 2 and located on either side of the central impact section 1 and lying substantially in the plane thereof. The sections of the bumper are preferably formed of resilient metal of bar form and of such dimensions as to be yieldable in horizontal directions and relatively non-yieldable in vertical directions.

The central impact section comprises two parallel and vertically spaced bars 4, 4 of a length substantially equal to the width of the vehicle frame, although less than the width of the bumper structure, said bars 4, 4 being connected together at their ends and likewise to the end sections 3, 3, by means of clamping members or junction plates 5, 5, hereinafter to be described more in detail.

As before suggested, the rear section 2 of the end sections 3, 3 are formed integral with each other and preferably formed from a single bar of metal by bending the end portions thereof into U-form, thus providing a substantially straight rear section 2 and comparatively short end sections 3, 3 spaced forwardly from the rear portion 2 and in parallel relation therewith, said end portions 3, 3 terminating inwardly from the extremities of the bumper a distance equal to substantially one-third of the width thereof.

Referring more in detail to the structure of the central impact section 1 and the junction plates 5, 5, each of the latter comprises a metal plate having a shape resembling that of a T, said plate comprising arms 6, 6 extending transversely to the bumper structure, there being provided slots in said arms for receiving the ends of the bars 4, 4. Likewise, there is formed in each of the plates a longitudinal channel extending centrally thereof and between the arms 6, 6, said channel being adapted to receive the free end portion of each end section 3, 3. A plurality of bolts 7 extend through the plate and act to clamp the same securely to the end section 3, and likewise to clamp the ends of the bars 4, 4 securely to the plate.

By this construction an impact bar is provided consisting of forward and rear impact members or sections, the forward impact section having the central portion thereof formed of vertically spaced bars which provide increased impact area calculated to afford a greater protection against injury to the more vital parts of the vehicle in the event of collision with obstacles of various kinds. If, for any reason, an obstacle should pass between the bars 4, 4 of the central impact section 1 the rear section 2, being located between the bars 4, 4, would receive the impact and thus prevent injury. In addition to its function as an intermediate bar located between the bars 4, 4 of the central impact section 1, the rear section 2 provides a secondary or reinforcing impact member serving to absorb a portion of the shock of impact should the central impact section be driven against it, thus affording greater degree of strength throughout the bumper structure and acting to resist the forces which would tend to permanently distort any part of the bumper inasmuch as it is a continuous bar extending throughout the width of the bumper and is integral with the end sections 3, 3.

As a means for connecting the bumper bar to the vehicle frame, there are employed clamping sleeves which surround the rear section 2 and end sections 3, 3, at a point inwardly from the extremities of the bumper, said sleeves being constructed to be clamped in place and to have pivotal connection with connecting bars 9, 9 extending forwardly from the end of the vehicle frame. In Figs. 1 and 2 the vehicle frame members 10, 10 are provided at their ends with shock absorbers 11, 11 of the so-called Westinghouse type, consisting of vertically arranged cylinders, said shock absorbers being tied together by means of a rod 12. As a means for connecting the bars 9, 9 to the vehicle, the same are mounted on the ends of the rod 12 and held in place by means of the nuts 13, 13. In Fig. 3 is illustrated the bumper bar, showing the manner in which the same would be connected directly to the frame members 10, 10, namely, by extending the connecting bars 14, 14 rearwardly beyond the ends of the frame members and clamping said bars thereto by means of suitable clamping members 15, 15.

Although I have illustrated and described the preferred embodiment of my invention, it is to be understood that I do not wish to be limited except in so far as the invention is more specifically described in the appended claims.

I claim as my invention:

1. In an automobile bumper, the combination of a central impact section comprising a bar extending throughout the length of the bumper and its ends bent forwardly in U-shape, forming relatively short end sections and a forward central impact section extending between and rigidly connected with said end sections.

2. In an automobile bumper, the combination of a central impact section comprising parallel bars spaced apart vertically, a rearwardly disposed bar extending throughout the length of the bumper and its ends bent forwardly in U-shape, forming end sections terminating in the plane of said central impact section, and clamping members rigidly connecting the ends of said central impact section and said end sections.

3. In an automobile bumper, the combination of a central impact section, comprising parallel bars spaced apart vertically, a rearwardly disposed bar having its end portions bent forwardly in U-shape, forming relatively short end sections terminating adjacent the ends of said central impact section, and means rigidly connecting the ends of said central impact section and said end sections.

4. In an automobile bumper, the combination of a central impact section, comprising parallel bars spaced apart vertically, a rearwardly disposed bar having its end portions bent forwardly in U-shape forming relatively short end sections terminating between the ends of said central impact section, and clamping members rigidly connecting the adjacent ends of said central impact section and said end portions.

5. In an automobile bumper, the combination of an impact member comprising a bar extending throughout the length of the impact member and having its end portions bent U-shaped and terminating a short distance inwardly beyond the ends of the impact member, and a central impact section comprising parallel bars spaced apart vertically, clamping plates rigidly connecting the ends of said bars of the impact section together, and having rigid connection with said end portions.

6. In an automobile bumper, the combination of an impact member comprising a bar extending throughout the length of the impact member and having its end portions bent U-shaped and terminating a short distance beyond the ends of the impact member, and an impact section comprising parallel bars spaced apart vertically, clamping plates rigidly connecting the ends of said bars of the impact section together, and having rigid connection with said end sections intermediate the bars of said central impact section.

In witness whereof, I hereunto subscribe my name this 20th day of March, A. D., 1920.

ALLAN L. McGREGOR.